(12) United States Patent
Castillo-Garza et al.

(10) Patent No.: US 12,313,562 B2
(45) Date of Patent: May 27, 2025

(54) FOREIGN OBJECT DEBRIS DISCRIMINATION WITH MODULATED LASER LIGHT

(71) Applicant: RTX Corporation, Farmington, CT (US)

(72) Inventors: Jose-Rodrigo Castillo-Garza, West Hartford, CT (US); David L. Lincoln, Cromwell, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/668,764

(22) Filed: May 20, 2024

(65) Prior Publication Data

US 2024/0319106 A1    Sep. 26, 2024

Related U.S. Application Data

(62) Division of application No. 17/383,781, filed on Jul. 23, 2021, now Pat. No. 12,019,028.

(51) Int. Cl.
*G01N 21/88* (2006.01)
*G01N 15/10* (2024.01)
*G02B 6/38* (2006.01)

(52) U.S. Cl.
CPC ......... *G01N 21/8806* (2013.01); *G01N 15/10* (2013.01); *G02B 6/3885* (2013.01);
(Continued)

(58) Field of Classification Search
CPC .............. G01N 21/8806; G01N 15/10; G01N 2015/1075; G01N 2201/06113; G02B 6/3885
See application file for complete search history.

(56) References Cited

U.S. PATENT DOCUMENTS 5,164,784 A * 11/1992 Waggoner ............... G01S 17/58
356/28
5,943,130 A * 8/1999 Bonin ................. G01N 15/0205
356/336
(Continued)

FOREIGN PATENT DOCUMENTS

EP     2212717 A2    8/2010
EP     2212717 B1 *  3/2015  ............ G01S 17/58

*Primary Examiner* — Jonathan M Hansen
*Assistant Examiner* — Jarreas Underwood
(74) *Attorney, Agent, or Firm* — Bachman & LaPointe, P.C.

(57) ABSTRACT

A method of foreign object debris discrimination includes illuminating a particle located within a sensing volume with a modulated electromagnetic radiation pulse emitted from a source; receiving one or more electromagnetic radiation return signals that have been scattered by the particle illuminated by the modulated electromagnetic radiation pulse at a detector; mixing, using a controller, the electromagnetic radiation return signal of amplitude $I_{RS}$ and frequency $f_{RS}$ with a reference signal of amplitude $I_{LS}$ and frequency $f_{RS}$; analyzing, using the controller, an amplitude of the mixed signal $\sqrt{I_{LS}I_{RS}}$, and frequency of the mixed signal, $f_{RS}-f_{LS}$; and classifying, using the controller, a particle position, a velocity, and electromagnetic characteristic of the particle based on the amplitude, $\sqrt{I_{LS}I_{RS}}$, and frequency, $f_{RS}-f_{LS}$, of the mixed signal.

9 Claims, 9 Drawing Sheets

(52) U.S. Cl.
CPC ............... *G01N 2015/1027* (2024.01); *G01N 2201/06113* (2013.01)

(56) References Cited

U.S. PATENT DOCUMENTS

| | | |
|---|---|---|
| 6,297,878 B1 * | 10/2001 | Miller ................... G01S 17/58 |
| | | 356/28.5 |
| 8,210,033 B2 | 7/2012 | Kondo et al. |
| 8,372,183 B2 | 2/2013 | Doucette et al. |
| 8,891,069 B2 | 11/2014 | Pederson et al. |
| 10,006,875 B2 | 6/2018 | Larkins et al. |
| 10,598,769 B2 | 3/2020 | Rodrigo et al. |
| 10,845,294 B1 | 11/2020 | Lincoln et al. |
| 10,871,452 B2 | 12/2020 | Lincoln et al. |
| 11,492,967 B2 | 11/2022 | Lincoln et al. |
| 2002/0159052 A1 | 10/2002 | Klooster et al. |
| 2012/0286098 A1 | 11/2012 | Poulos |
| 2016/0306043 A1 | 10/2016 | Moss et al. |
| 2021/0025977 A1 | 1/2021 | McVey et al. |
| 2021/0302577 A1 * | 9/2021 | Park ..................... G01S 7/4811 |
| 2022/0187202 A1 | 6/2022 | Lincoln et al. |
| 2022/0283297 A1 | 9/2022 | Bialer et al. |

\* cited by examiner

FOREIGN OBJECT DEBRIS DISCRIMINATION WITH MODULATED LASER LIGHT

CROSS-REFERENCE TO RELATED APPLICATION

This application is a divisional of U.S. patent application Ser. No. 17/383,781, filed Jul. 23, 2021.

BACKGROUND

The present disclosure relates to foreign object debris discrimination.

Aircraft engines can be damaged by Foreign Object Debris (FOD). Large objects can cause significant changes detected by engine monitoring systems, such as shaft vibration measurement. Smaller objects however, such as sand grains, can cause damage that is barely visible but may still damage or weaken components.

Various optical particulate ingestion sensor systems are being integrated into gas turbine engines to identify FOD. Various multi-wavelength, multi-angle scattering light sources (e.g., LED) and sensors (e.g., photodiodes) provide scattering cross sections, however, this may not be suitable for FOD which can have complex geometries and may be composed of multiple materials. Further, due to the reflective and transient nature of particulate FOD such as moisture, fog, dust, ash, or smoke, the visibility conditions of the FOD may be effected.

SUMMARY

A method of foreign object debris discrimination according to one disclosed non-limiting embodiment of the present disclosure includes illuminating a particle located within a sensing volume with a modulated electromagnetic radiation pulse emitted from a source; receiving one or more electromagnetic radiation return signals that have been scattered by the particle illuminated by the modulated electromagnetic radiation pulse at a detector; mixing, using a controller, the electromagnetic radiation return signal of amplitude $I_{RS}$ and frequency with a reference signal of amplitude and frequency; analyzing, using the controller, an amplitude of the mixed signal, and frequency of the mixed signal, and classifying, using the controller, a particle position, a velocity, and electromagnetic characteristic of the particle based on the amplitude, and frequency, of the mixed signal.

A further embodiment of any of the foregoing embodiments of the present disclosure includes that the reference signal with amplitude $I_{LS}$ and frequency $f_{LS}$ is amplified by the return signal with amplitude $I_{RS}$ and frequency $f_{RS}$.

A further embodiment of any of the foregoing embodiments of the present disclosure includes that analyzing, using the controller, the amplitude of the mixed signal $\sqrt{I_{LS}I_{RS}}$ further comprises scattering information from the particle, its scattering regime $$\left(\frac{a}{\lambda}\right)$$

provides particle characteristic size, a, information.

A further embodiment of any of the foregoing embodiments of the present disclosure includes that analyzing, using the controller, the amplitude of the mixed signal comprises signals from different viewing angles.

A further embodiment of any of the foregoing embodiments of the present disclosure includes that analyzing, using the controller, the amplitude of the mixed signal comprises signals from different wavelengths.

A further embodiment of any of the foregoing embodiments of the present disclosure includes that the electromagnetic characteristic further comprises the particle's complex index of refraction.

A further embodiment of any of the foregoing embodiments of the present disclosure includes that the modulated electromagnetic radiation pulse emitted from the source is used as both to transmit a signal to illuminate particles and as a reference to provide a local modulated signal.

A further embodiment of any of the foregoing embodiments of the present disclosure includes that the modulated electromagnetic radiation pulse emitted from the source is emitted as a single frequency.

A further embodiment of any of the foregoing embodiments of the present disclosure includes determining a velocity of the particle using the particle's Doppler shift from the frequency of the mixed signal $f_{RS}-f_{LS}$.

A further embodiment of any of the foregoing embodiments of the present disclosure includes that the particle velocity is determined almost simultaneously with a relative position of the particle.

A further embodiment of any of the foregoing embodiments of the present disclosure includes determining a velocity of the particle and a relative distance with respect to the source quasi-simultaneously with a triangular modulation depending on the modulation rate B/T measuring the two beats $\Delta f_{up}$ and $\Delta f_{down}$ where the source emits at a frequency within a modulation bandwidth $B=f_{max}-f_0$.

A system for particulate discrimination according to one disclosed non-limiting embodiment of the present disclosure includes a continuous wave (CW) laser; a modulator downstream of the continuous wave (CW) laser; a circulator downstream of the modulator; a detector in communication with the circulator; a controller; and a tangible, non-transitory memory configured to communicate with the controller, the tangible, non-transitory memory having instructions stored thereon that, in response to execution by the controller, perform operations comprising: analyzing a frequency beats of a particle at different points in a modulated electromagnetic radiation pulse from the continuous wave (CW) laser to provide a particle velocity and a relative position of the particle.

A further embodiment of any of the foregoing embodiments of the present disclosure includes that the modulated electromagnetic radiation pulse is a visual signal.

A further embodiment of any of the foregoing embodiments of the present disclosure includes that the modulated electromagnetic radiation pulse is an infrared signal.

A further embodiment of any of the foregoing embodiments of the present disclosure includes that the modulated electromagnetic radiation pulse is a terahertz signal.

A further embodiment of any of the foregoing embodiments of the present disclosure includes a sensor interface optic system downstream of the circulator.

A further embodiment of any of the foregoing embodiments of the present disclosure includes that the sensor interface optic system comprises a coupling optic in a surface of a gas turbine engine.

A further embodiment of any of the foregoing embodiments of the present disclosure includes a fiber optic in optical communication with the sensor interface optic system.

A further embodiment of any of the foregoing embodiments of the present disclosure includes that the fiber optic comprises a single core.

A further embodiment of any of the foregoing embodiments of the present disclosure includes that the fiber optic includes a multiple of cores for coupling scattered light back to the circulator to mix the transmitted modulated electromagnetic radiation pulse with a return signal for processing.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
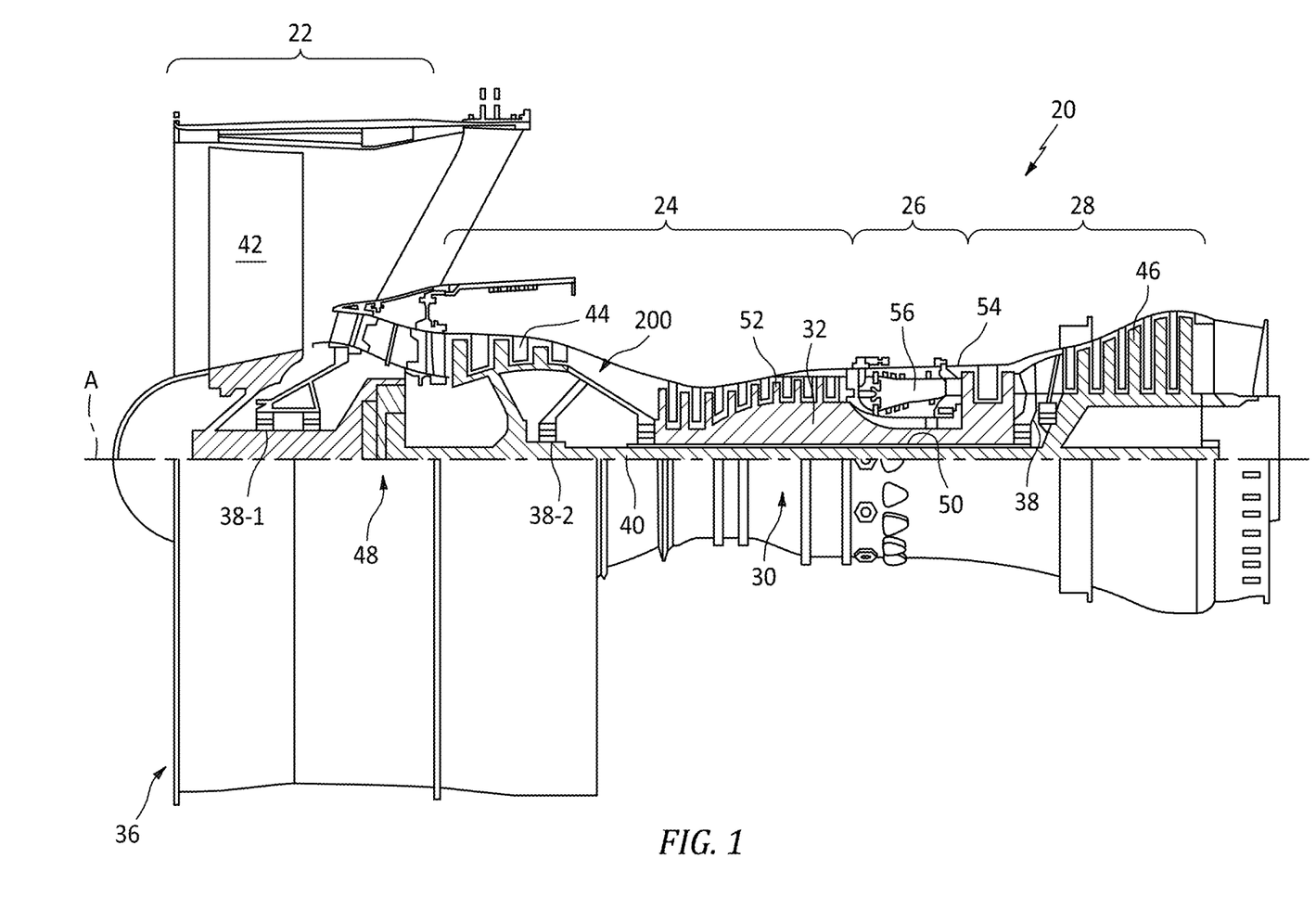
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures.

The engine 20 generally includes a low spool 30 and a high spool 32 mounted for rotation about an engine central longitudinal axis A relative to an engine case structure 36 via several bearing compartments 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 rotationally drive the respective high spool 32 and low spool 30 in response to the expansion.

Figure 2:
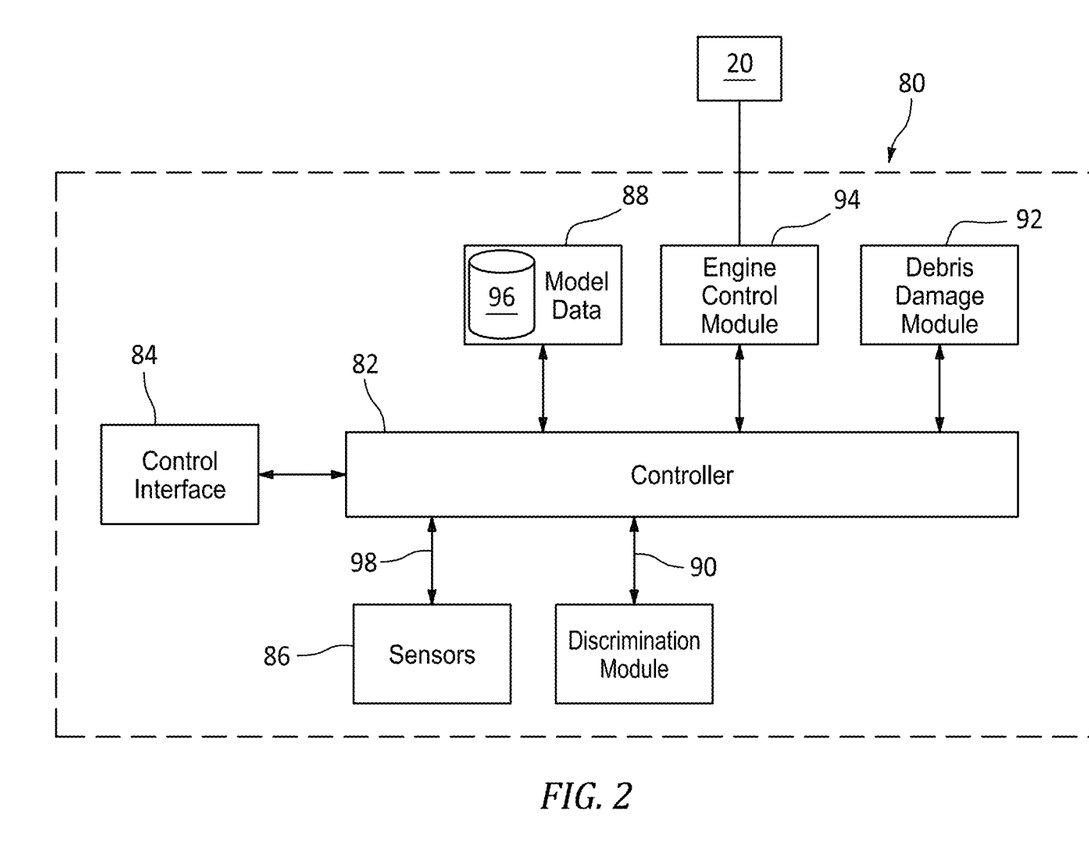
FIG. 2 is a perspective view of a system for particulate discrimination.

With reference to FIG. 2, a system 80 for particulate discrimination includes a controller 82, a control interface 84, a sensor system 86, a database 88, a discrimination module 90, a debris damage module 92, and an engine control module 94. The controller 82 may be configured as a central network element or hub with access to various systems and may be implemented in a single processor, one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, or any combination thereof. The controller 82 may include a processor configured to implement various logical operations in response to execution of instructions. For example, instructions may be stored on a non-transitory, tangible, computer readable medium configured to communicate with other components. In response to execution by the controller, the system 80 performs various operations.

The controller 82 may also be in electronic communication with a user through the control interface 84, for example, a multifunction display. The control interface 84 enables a user to interact with the system 80, to issue commands and display information such as warnings.

The controller 82 may also be in electronic communication with the sensor system 86 that may include, for example, as a particulate sensor, a temperature sensor, a torque sensor, a speed sensor, a pressure sensor, a position sensor, an accelerometer, a mass flow sensor, etc.

The controller 82 may also be in electronic communication with the database 88 to store and maintain data such as sensor data, configuration settings, response models such as the model data 96, and/or the like. Data may be stored or recalled from the database 88 in response to commands from the controller 82.

The controller 82 may also be in electronic communication with the discrimination module 90. The discrimination module 90 may receive sensor data 98 to discriminate between categories of foreign object debris including hard FOD (e.g., fasteners, rocks, etc.) and particulate FOD (e.g., silicate sand, dust, volcanic ash, sea-salt, smoke, steam, water vapor, and/or the like). In one example, the hard particulate FOD may be anything larger than about 1 mm (0.04 inches). Particulate FOD can also be damaging, but is not labeled as "hard" FOD. Hard vs soft corresponds to size (hard>1 mm, particulate<1 mm average particle diameters). Both hard and particulate may be damaging or non-damaging, for example, a large piece of chalk (>>1 mm) is considered non-damaging hard FOD.

The discrimination module 90 discriminates between categories of foreign object debris based on the sensor data 98 and algorithms such as the model data 96 which may define the various categories of hard FOD and particulate FOD within a look-up table or other relationship. The discrimination module 90 may determine a quantity, a size, and a type of the FOD including both hard and soft FOD. In various embodiments, the sensor data 98 may also include GPS data and/or atmospheric data to provide a spacial component to the FOD events.

The controller 82 may also be in electronic communication with the debris damage module 92. The debris damage module 92 may receive outputs from the discrimination module 90 and/or the sensor data 98 and is configured to determine a particulate concentration within the engine 20. The debris damage module 92 may determine a quantity or time-based map of ingested particulates between an inlet and an exhaust of the bypass flow-path and/or the core flow-path. The debris damage module 92 may determine a hazard level for a given particulate type and/or concentration and may record debris data based on the hazard level, the particulate type, or the particulate concentration. In various embodiments, the damage module 92 may generate a debris alert or a damage alert via the control interface 84.

The damage module 92 may calculate accumulated engine damage using a physics-based model of the turbine engine 20. The damage model 92 may be implemented separately or may be stored in the database 88. The damage model 92 may include modeling of gas turbine engine 20 component erosion based on the particulate type of FOD. The damage module 92 may provide the accumulated damage as a percentage of engine life remaining or a time before engine failure and display these measures via the control interface 84. The damage module 92 may also generate an alert based on exceeding a threshold value.

The controller 82 may also be in electronic communication with the engine control module 94. The engine control module 94 may be configured to command the engine 20 to, for example, instruct the engine 20 to increase or decrease shaft speeds, fuel flow, vane geometry, alter bypass airflow, set valves, etc. In various embodiments, the controller 82 may control the turbine engine 20 in response to the damage module 92 and/or discrimination module 90 outputs. For example, the engine control module 94 may reduce fuel flow in response to exceeding an engine damage threshold as determined by the damage module 92.

Figure 3:
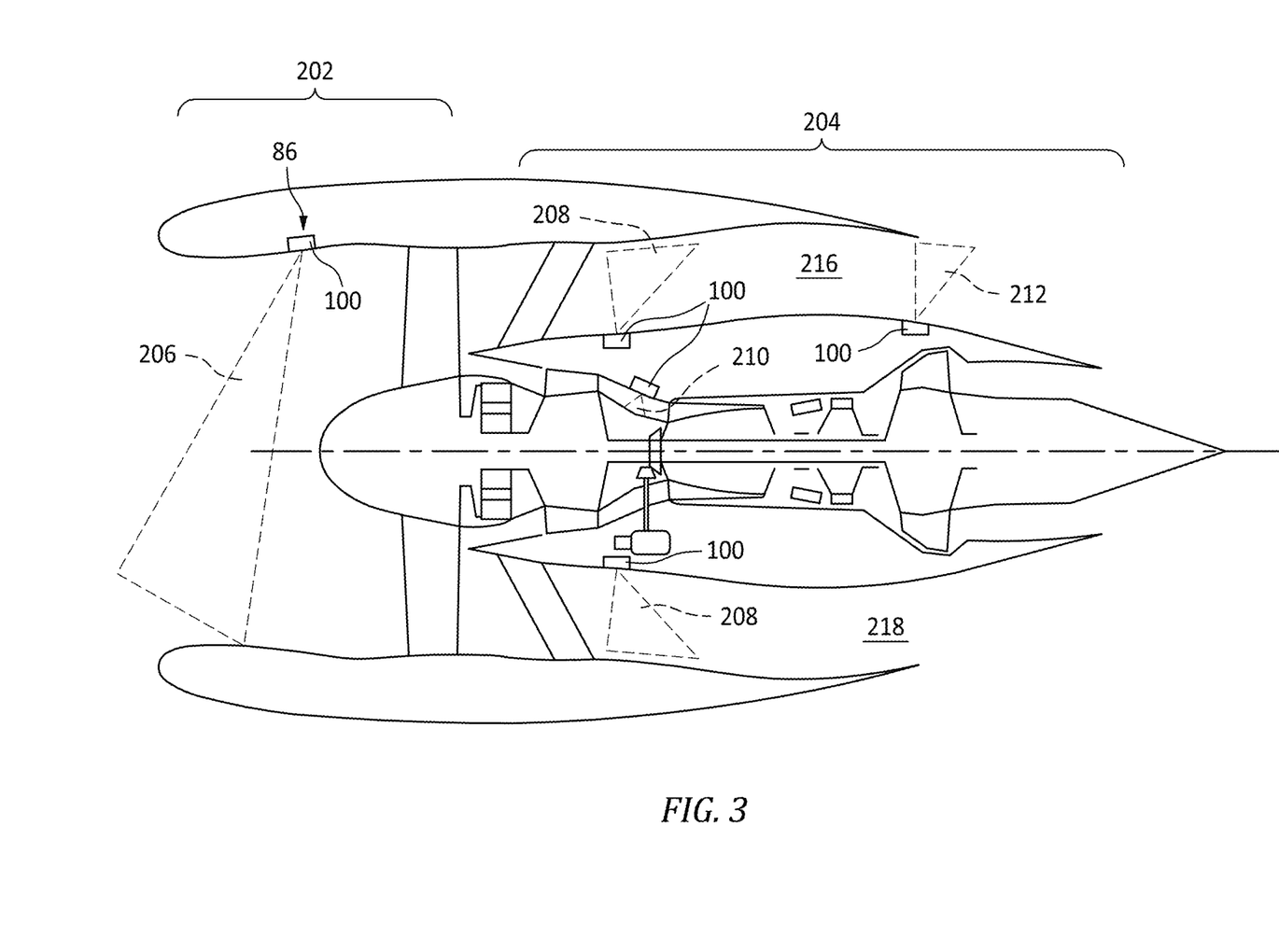
FIG. 3 is sectional view of a nacelle assembly for the gas turbine engine with the foreign object detection system.

With reference to FIG. 3, in various embodiments, the sensor system 86 includes a particulate sensor assembly 100 having sensing volumes in areas such as an inlet ingestion sensing region 202 and a turbine gas path sensing region 204. A first sensing volume 206 may define the inlet ingestion sensing region 202. A second particulate sensor assembly may be arranged to observe a second sensing volume 208 within bypass flow-path proximate the inlet 214 of bypass duct 216. A third particulate sensor assembly may be coupled to the compressor section 24 to observe a third sensing volume 210 within core flow-path. A fourth particulate sensor assembly may be coupled proximate the exit 218 of bypass duct 216 to observe a fourth sensing volume 212 of the bypass flow-path exhaust and/or the core flow-path exhaust. It will be appreciated that any number of sensing volumes may be defined by a particulate sensor assembly configured for a particular area of interest.

In one embodiment, the sensor assembly 100 operates in the optical realm. The term "optical" as utilized herein refers to electromagnetic radiation in the wavelength range between 100 nm and 1 mm. The terms "light" and "visible radiation" (VIS) refer to the wavelength range between 400 nm and 800 nm, which can be perceived by the human eye. Optical radiation with wavelengths shorter than 400 nm is called ultraviolet (UV) radiation and is further subdivided in UV-A, UV-B and UV-C ranges. Optical radiation with wavelengths longer than 800 nm is called infrared radiation (IR) and is similarly divided into IR-A (near-infrared, or NIR), IR-B (short-wavelength infrared, or SWIR), and IR-C (long-wavelength infrared, or LWIR). In this embodiment, the blue LED may emit light between 380 nm and 600 nm and the infrared LED may emit light at a wavelength between 600 nm and 2000 nm. The terahertz (THz) regime (e.g., GHz-THz: 50 GHz (6 mm)-3 THz (0.1 mm); THz is typically defined as 0.3-3 THz (1 mm-0.1 mm) facilitates discrimination of hard FOD. Materials such as plastic, gasoline, paper, etc. are essentially transparent in the terahertz (THz) regime while metal and carbon fiber, which are typical examples of hard FOD, are reflected, providing a parameter by which to discriminate between damaging and non-damaging FOD. The terahertz (THz) regime spectroscopy is also able to obtain spectra for water vapor, polar plastics, etc., to thereby permit enhanced discrimination and identification thereof. Operation in the terahertz (THz) regime provides a response to materials in comparison to the UV/VIS/IR optical regime spectroscopy to provide additional parameters for discrimination between damaging and non-damaging FOD. Each source can be configured to emit within a specific GHz-THz waveband, or scan across wavebands. Scanning across wavebands enables discrimination via terahertz (THz) spectroscopy or multiple wavebands from different sources also enables terahertz (THz) spectroscopy measurements if wavebands are selected for materials of interest to identify. In addition to providing discrimination and identification of FOD, interrogation with GHz-THz wavebands enables the sensor to detect hard FOD in the presence of high concentrations of particulates, such as dust and fog that are transparent in specific GHz-THz wavebands. This feature is also useful for providing robustness to contamination on the surface of the sensor, where the GHz-THz radiation, unlike visible-IR radiation, can penetrate through such contaminants such as oil, dirt, and water without significant losses or scattering which would otherwise adversely affect the detection and discrimination of FOD.

Figure 4:
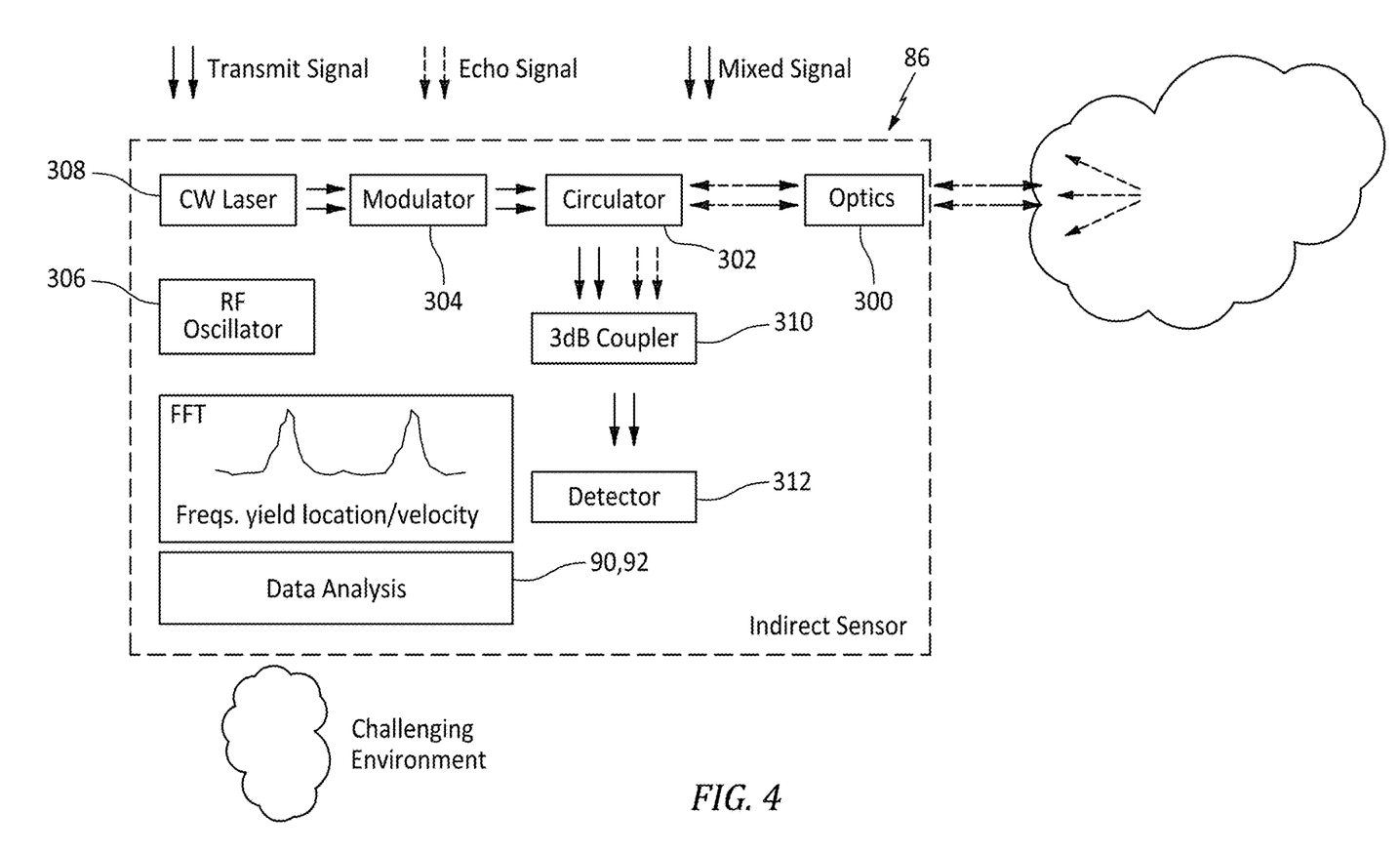
FIG. 4 is a schematic view of a particulate sensor system.

With reference to FIG. 4, in one illustrated embodiment, the sensor system 86 may include a coherent Light Detection and Ranging (LIDAR) sensor source. The sensor system 86 generally includes sensor interface optic system 300, a circulator 302, a modulator 304, an RF oscillator 306 and a continuous wave (CW) laser 308. The circulator 302 is a passive, non-reciprocal three or four-port device that only allows a microwave or radio-frequency signal to exit through the port directly after the one it entered. The circulator 302 is in communication with a 3 dB coupler 310 thence to a detector 312 that is in communication with the damage module 92 and/or discrimination module 90 outputs. A "3 dB coupler" enables the reference signal and the received signal to be combined before being converted into an electrical signal by the detector 312, however, various coupling schemes may be utilized. Alternatively, the circulator 302 may be in communication directly with the detector 312.

Figure 5:
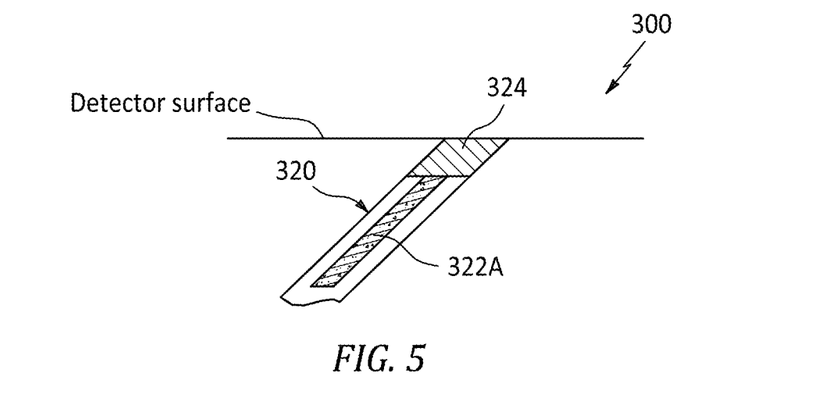
FIG. 5 is a schematic view of a fiber optic light coupling according to one disclosed non-limiting embodiment.
Figure 6:
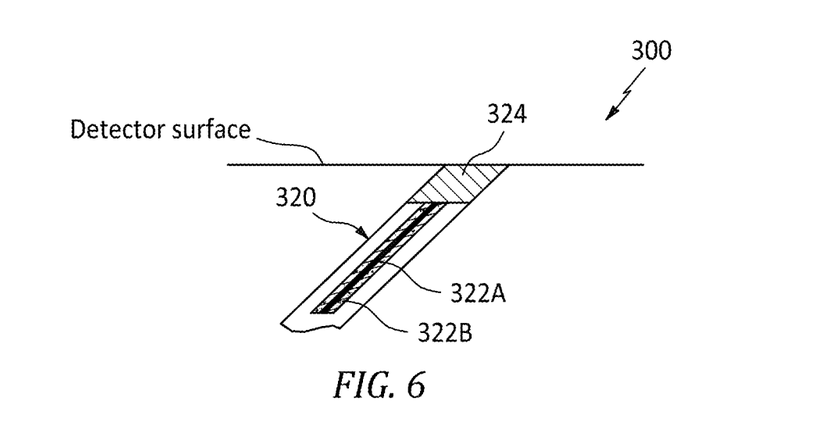
FIG. 6 is a schematic view of a fiber optic light coupling according to another disclosed non-limiting embodiment.

The sensor interface optic system 300 may include a fiber optic cable 320 with one core 322A (FIG. 5) or a multiple of cores 322A, 322B (FIG. 6). A coupling optic 324 such as a lens may be utilized to increase sensitivity by increasing the collection area, and provide beam shaping to tailor the sensing region. The coupling optic 324 may be located in a surface adjacent to a gas turbine engine gas path to provide a smooth flow path. A window (e.g. composed of sapphire) may also be utilized in addition to or in place of the coupling optic to provide robustness to the sensor where the window may be located in a surface adjacent to a gas turbine engine gas path to provide a smooth flow path. That is, the coupling optic 324 can be located remote from the continuous wave (CW) laser 308 with the fiber optic cable 320 therebetween.

A dual core fiber optic (FIG. 6) may be used for coupling modulated laser light. The dual-core fiber optic may be used for coupling the scattered light back to the circulator 302 to mix the transmitted signal with the return signal for processing. The dual-core fiber optic may reduce optical noise that may be otherwise caused by scattering of the transmitted signal back to the circulator. Alternatively, multi-core bundles of fiber optics may be utilized to provide multiple source locations for triangulation without substantially increasing the sensor footprint.

Multiple sensing volumes which may be considered as the overlap between light source emission and detector field-of-view of the respective source/detector combinations, provide the sensor with additional information about the type of the particles. Multiple detectors positioned to receive light scattered at different scattering angles, which may be considered angle between the light cone's central axis and the central axis of the detector's field of view, interrogate the size of the FOD as the light scattering cross section of the FOD is dependent on both the scattering angle and the size of the FOD and may provide information on the surface roughness of hard FOD. Furthermore, the FOD's light scattering cross section is also dependent on wavelength. Thus, the signals received from light sources of multiple wavelength provides additional information on the size of the particle, but also may provide information on the surface optical properties, such as reflectance and absorption for discriminating FOD types.

Particulate FOD is more representative of signals being detected by both overlapping and non-overlapping sensing volumes. Hard FOD may only be detected by the non-overlapping sensing volume at a distance from the detector where typically particulate FOD will not be detected as the scattered light is at such low intensity (scattered light from particulate FOD close to the sensor can be detected). As demonstrated for smoke detection applications, multiple angles can be used to discriminate particulate types in close proximity to the sensor (assumes particulate FOD is dispersed throughout the inlet), however if hard FOD is close enough to the sensor to pick up the side and forward scatter, that information can be used to provide additional discrimination (surface roughness of hard FOD, absorbance, reflectance).

Figure 7:
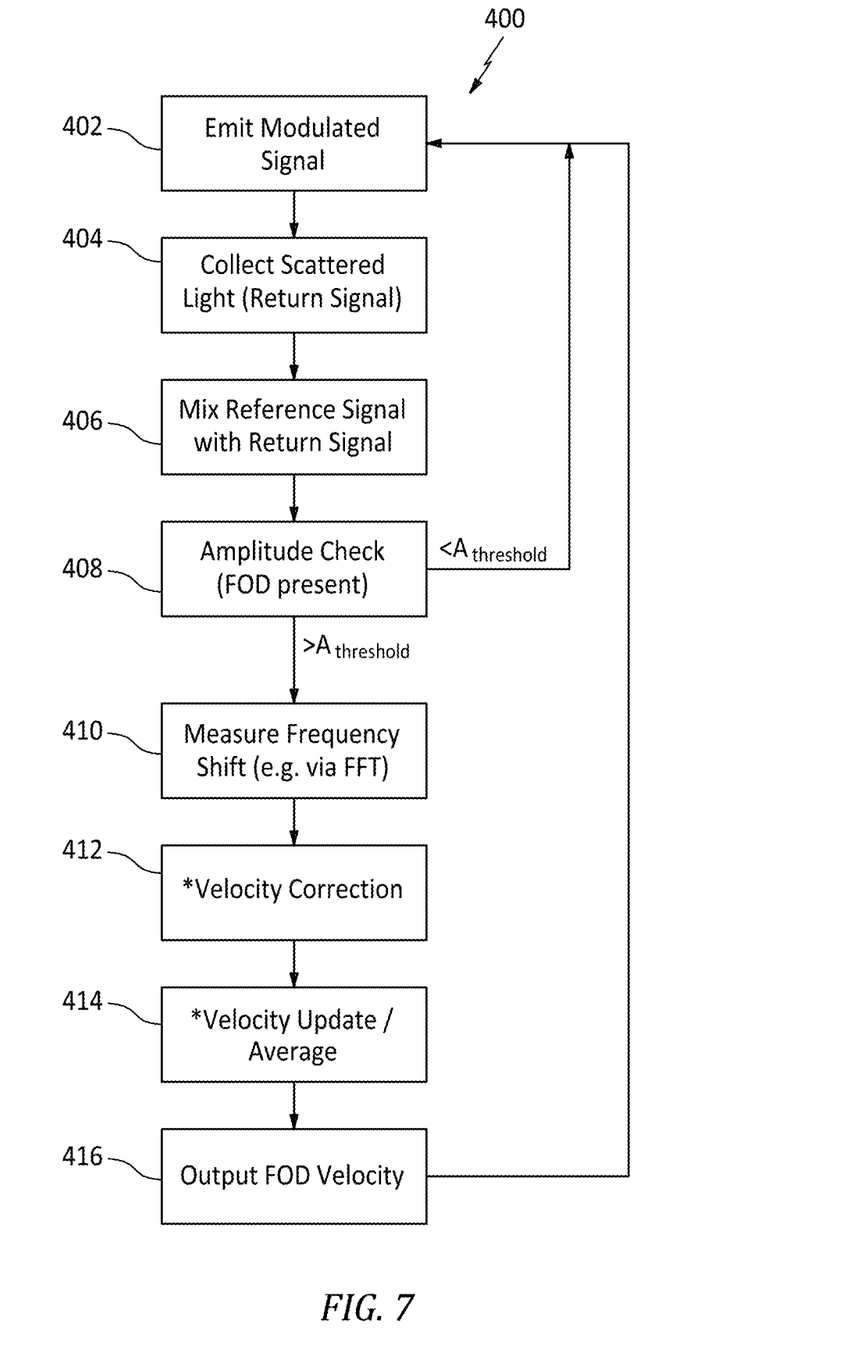
FIG. 7 is a block diagram illustrating operation of the foreign object detection system according to one non-limiting embodiment.

With reference to FIG. 7, a method 400 of foreign object debris discrimination with the detection system 80 is disclosed in terms of functional block diagrams. The functions of the logic are programmed software routines capable of execution in various microprocessor based electronics control embodiments and represented herein as the block diagrams. These functions may be enacted in either dedicated hardware circuitry or programmed software routines capable of execution in a microprocessor-based electronics control embodiment.

Initially, a modulated, e.g., amplitude, frequency, etc., coherent light source (Visual; Infrared; Terahertz wavelength range) is emitted (402). The source emits at a frequency within a modulation bandwidth:

$$B = f_{max} - f_0.$$

The modulation frequency needs to be fast enough to correspond with light to be emitted, scattered, and returned. For example, the precision on the velocity can be determined by $$\frac{d_p B}{Tf},$$

where $d_p$ is the precision on the distance to the target, B is the frequency sweep bandwidth, T is the duration of the pulse, and f is the frequency of the laser source (corresponding to the wavelength of light via $\lambda f = c$, where $\lambda$ is the wavelength of the laser source, and c is the speed of light); and $d_p$ is calculated via $$\frac{c}{2f_s},$$

where $f_s$ is the sampling frequency of the received signal. The frequency may be linearly dependent with time and takes a time T from $f_0$ to $f_{max}$. The source has a spatial/temporal coherence from the source to the FOD particle and back. The same coherent source is used as a transmit signal to illuminate the FOD particles and as reference, local modulated signal. That is, a majority of the coherent light is transmitted towards the FOD particles to illuminate the FOD particles and a small fraction is used as a reference dependent on the light scatter. The reference signal will have the same frequency of the transmitted signal.

The light scattered from the FOD particles is then collected (404) at the detector 312. Next, the reference signal is mixed with the return signal (406). The total signal at the detector may be expressed as:

$$I \propto I_{LS} + I_{RS} + 2(\sqrt{I_{LS} I_{RS}})\cos(2\pi(f_{RS} - f_{LS})t)$$

where $I_{LS}$ and $f_{LS}$ is the return signal amplitude and frequency, respectively, and $I_{RS}$ and $f_{RS}$ is the mixed reference signal amplitude and frequency, respectively.

If a FOD particle is stationary with respect to the non-modulated light source, the frequency of the return, $f_{RS}$, and the reference signal $f_{LS}$, frequency are the same.

Particle velocity can be found if the particle is moving with respect to a non-modulated light source, $f_{RS}-f_{LS}\neq 0$ due to the Doppler effect.

$$\Delta f_{Doppler} \approx \frac{2v}{\lambda}$$

Relative particle distance with respect to detector cannot be obtained for all distances with returned signal and local signal phase difference ($\varphi_{RS}-\varphi_{LS}$). Phase difference is an ambiguous metric for large particle distances.

Next, an amplitude check is performed (408). The amplitude check may be utilized to determine if particulate FOD or hard FOD is detected. For example, the amplitude check would identify if a pulse shape from separate sensors is sufficiently narrow and of low amplitude to be considered particulate FOD, while a larger pulse width and amplitude will be indicative of hard FOD. Furthermore, if a low amplitude pulse of sufficiently large pulse width is detected on the backscatter sensor, but not in the forward or side scatter sensors, then the particulate can be considered hard FOD that has been detected at a distance beyond the forward and side scatter sensing volumes. The foreign object debris size and type can be based on characterizing the one or more particulates of foreign object debris. For example, through testing and calibration, the sensor data may have different signatures that can be used to distinguish between particulates, smoke, dust, water, and metallic particulates. Since signal strength may vary depending upon the distance of particulate FOD from the optical sensors, the controller can compute ratio values to scale results. Scattering volume ratios can provide information on the type of particulate based on the scattering properties, such as polarization and index of refraction.

Recognition of the resultant FOD type facilitates determination of maintenance requirements such that scheduling thereof may be reduced. The ability of wavelength range within a terahertz (THz) regime to have a different optical response to materials in comparison to the optical (UV/VIS/IR) regime provides additional parameters for discrimination of damaging and non-damaging FOD. Also, spectral information is capable of providing identification of specific material, e.g. water vapor, in addition to providing sensor robustness to contamination (such as water and oil) on the surface of the detector and ability to detect hard FOD in the presence of high concentration of specific particulate FOD (such as fog and dust).

The signal phases are not relevant in a modulation scheme. Next, the frequency shift is determined (410).

If the particle is stationary with respect to the detection system:

$$f_{RS} - f_{LS} = 0:$$

The frequency difference is proportional to the transmitted signal round trip travel time from the source to FOD particle and back, after being scattered by the FOD particle, to the detector 312. Travel time is proportional to the FOD particle's relative distance to detection system.

Figure 8:
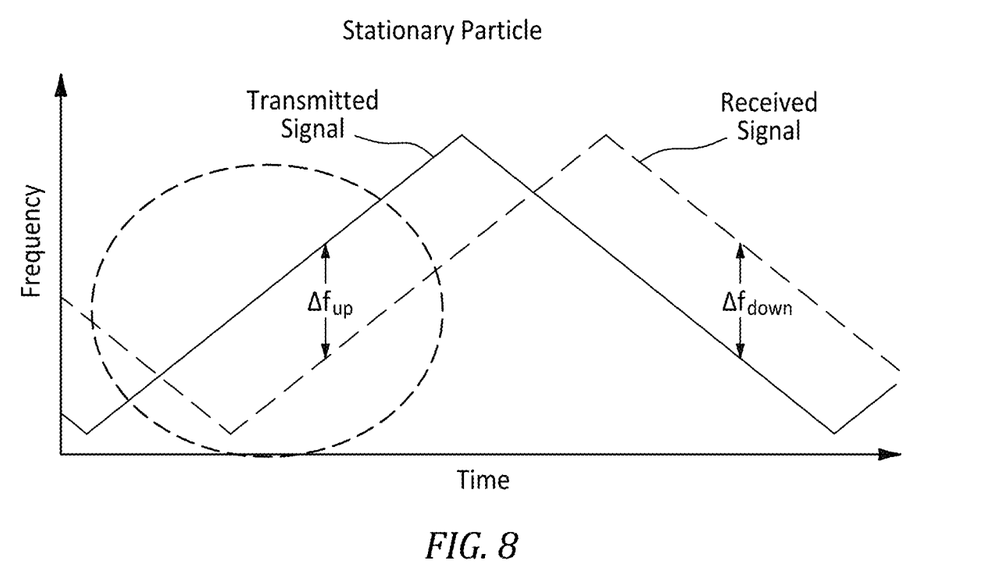
FIG. 8 is a graphical representation of a source frequency modulated with a triangular function for a stationary particle, the dotted circle shows the frequency shift.

A source frequency is modulated with a triangular function, e.g., the dotted circle in FIG. 8 shows the frequency shift. $\Delta f_{up}$ and $\Delta f_{down}$ would have the same beat frequency.

Figure 9:
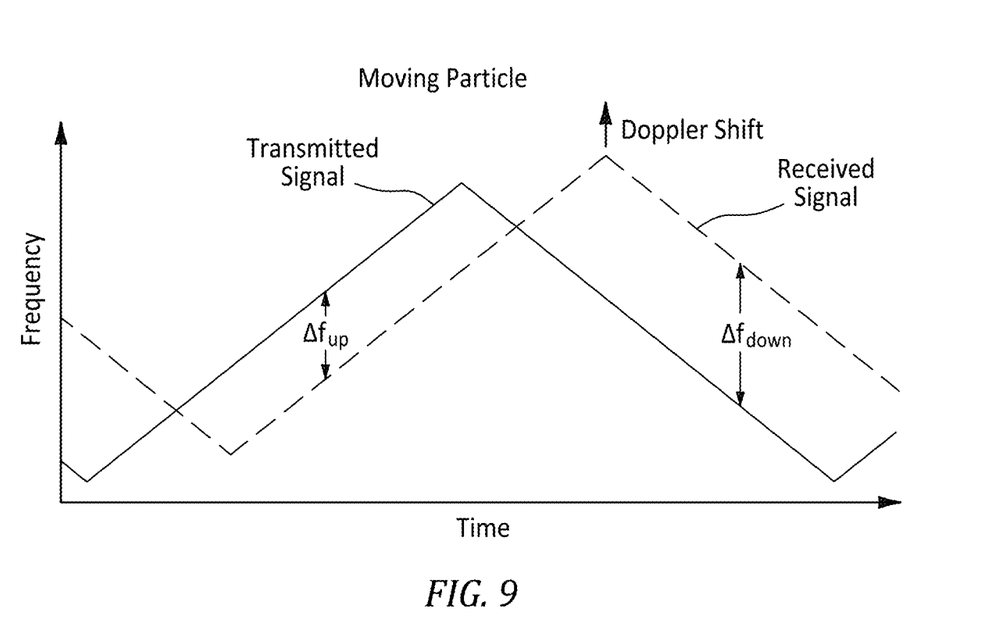
FIG. 9 is a graphical representation of a source frequency modulated with a triangular function for a moving particle.

If the particle is moving with respect to the detection system, $$f_{RS} - f_{LS} \neq 0:$$

the frequency of the received signal is shifted in time due to the Doppler shift. The difference in traversed paths between the reference signal and the received signal (FIG. 9) shows for a source frequency modulated with a triangular function.

$\Delta f_{up}$ and $\Delta f_{down}$ are different frequency beats due to the FOD particle's velocity, i.e., the Doppler shift.

The FOD particle velocity and relative distance with respect to the detection system can be obtained with a triangular modulation quasi-simultaneously, depending on the modulation rate B/T measuring the two beats, $\Delta f_{up}$ and $\Delta f_{down}$.

The FOD particle relative position, R, with respect to the detection system is:

$$R = \frac{cT(\Delta f_{up} + |\Delta f_{down}|)}{4B}$$

The FOD particle's velocity, Vr, with respect to the detection system is:

$$V_r = \frac{\lambda(\Delta f_{up} - |\Delta f_{down}|)}{4}$$

This is assuming that $$\frac{2BR}{cT} > \frac{2V_r}{\lambda}$$

but if the relationship is less than, the signs in the above equations are reversed.

The analysis of the frequency beats provides the particle's Vr and R. The particle's velocity vector (without assuming laminar flow), and with a minimum of one source and three detectors with different viewing angles surrounding the source are required.

Since the distance (and velocity) from the sensor to the FOD particle can only be determined along the vector from the sensor to the FOD particle, triangulation can be utilized with multiple sensors to determine the FOD particle's absolute position (and velocity). Triangulation is implemented to determine the velocity components with respect to an engine intake reference system. Analysis of frequency beats of the FOD particle at different points in the beam will increase the velocity and relative position accuracy. Visual; Infrared; Terahertz wavelength range combination, all using the frequency beats technique, provides complementary information to discriminate types of FOD particulates. For example, to determine the position and velocity of FOD particulates and to provide additional parameters (via interrogation using multiple wavelengths and scattering angles) to characterize FOD particulates by size and type.

The particle classification is not based on frequency but into the amplitude of the mixed signal $\sqrt{I_{LS}I_{RS}}$. The particle scattering signal, $I_{LS}$, is amplified by the reference signal, $I_{RS}$, hence this technique is more sensitive to the type of particle crossing detectors.

The total signal at one detector may be defined as:

$$I \propto I_{LS} + I_{RS} + 2(\sqrt{I_{LS}I_{RS}})\cos(2\pi(f_{RS} - f_{LS})t)$$

Analysis of the amplitude of the mixed signal, $\sqrt{I_{LS}I_{RS}}$ will yield particle classification. $\sqrt{I_{LS}I_{RS}}$ has scattering information from the particle: Its scattering regime $$\left(\frac{a}{\lambda}\right)$$

provides particle characteristic size, a, information. Especially when combined with mixed signals from source/detectors systems at different viewing angles and from different wavelengths, Vis, IR and THz.

$I_{LS}I_{RS}$ also provides particle electromagnetic absorption characteristics, through particle's complex index of refraction. THz waves particular interaction with materials provides a key differentiator to classify particles. This is enhanced when THz signals are compared to IR or Vis signals of the same particles. Scattering results are compared with tabulated data of hard FOD scattering data to determine with more accuracy the type of particle.

Figure 10:
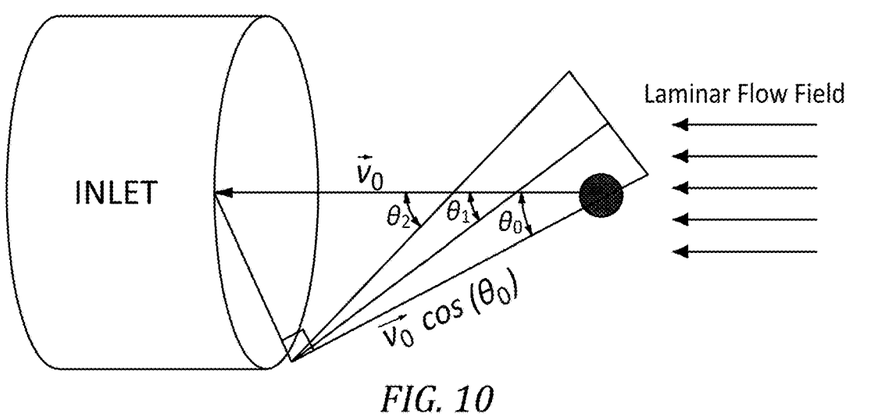
FIG. 10 is schematic view of a LIDAR sensor embodiment according to another disclosed non-limiting embodiment.

Optionally, a velocity correction (412) and a velocity update average (414) may be performed by assuming laminar flow. The velocity correction may begin with an initial FOD particle velocity measurement corrected by the angle of coincidence because the velocity measured will be a scalar projection of the FOD velocity. Thus, the measured velocity must be divided by COS (theta) to obtain the FOD velocity assuming the FOD has a velocity in the direction of the laminar flow field (FIG. 10). To achieve a high degree of certainty on the velocity, the measurement process can be iterated as the FOD passes through the entire sensing region, whereby theta will also be changed theta0, theta1, and theta2 (and angles therebetween). The velocity may thus be averaged by performing the measurements iteratively, and an updated FOD particle velocity will be output after the FOD particle has completed its trajectory passing entirely through the sensing region.

Figure 11:
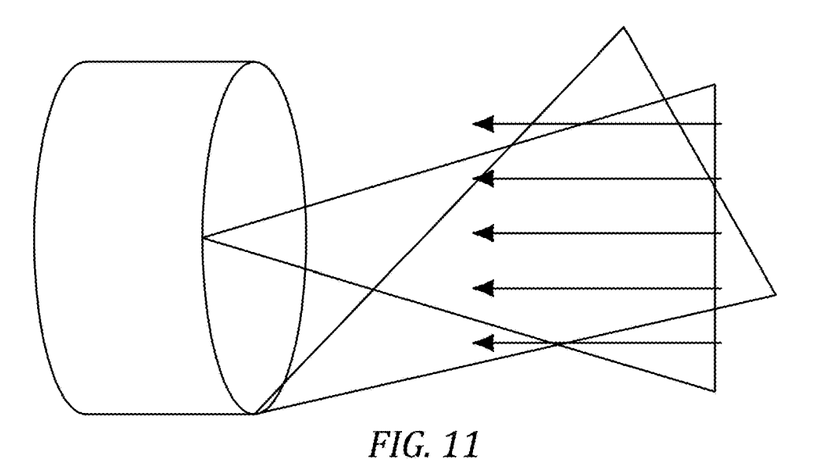
FIG. 11 is schematic view of a LIDAR sensor embodiment according to another disclosed non-limiting embodiment.

Alternatively, independent LIDAR sensors (FIG. 11) that are angled relative to one another may be utilized to provide additional measurements in different direction to determine to what extent the FOD is deviating from the laminar flow trajectory to provide robustness to velocity measurement. When two independently located LIDAR sensors are utilized, both should confirm measurement of a velocity within the uncertainty of the measurement for a given FOD event that is traveling axially through the inlet, following the trajectory of the laminar flow field and confirming the FOD is traveling with the laminar flow. With two independent LIDAR sensors, deviations between the measured velocities would indicate that the FOD particulate is indeed not following the trajectory of the laminar flow field. The extent of the deviation could then be used to assign a more accurate measurement uncertainty.

Figure 12:
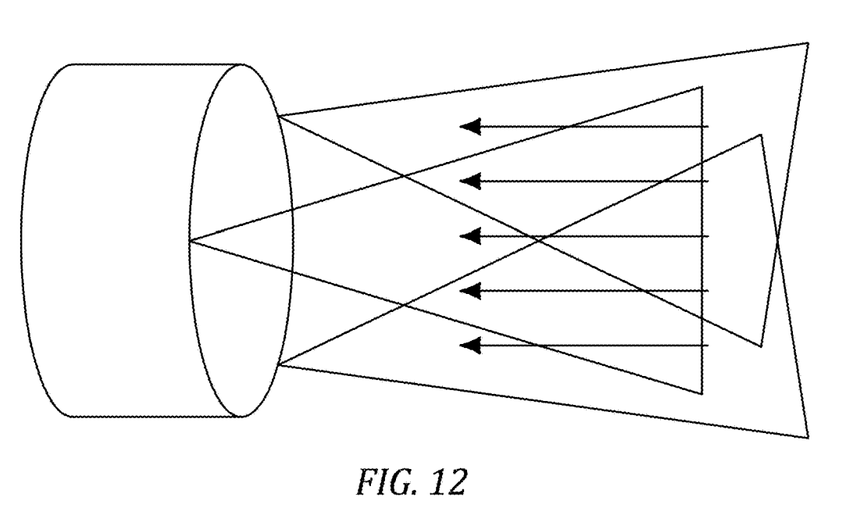
FIG. 12 is schematic view of a LIDAR sensor embodiment according to another disclosed non-limiting embodiment.

Alternatively, three independent LIDAR sensors (FIG. 12) located at circumferentially around the inlet may be utilized to provide an absolute velocity without requiring assumption that the FOD particulates follow a laminar flow trajectory as necessary when using only one or two LIDAR sensors. The true trajectory is determined via triangulation of the velocity components. Localization in each of these embodiments may require assumptions of the FOD optical properties such as refractive index, size, geometry, etc., based on the received signal intensity.

Figure 13:
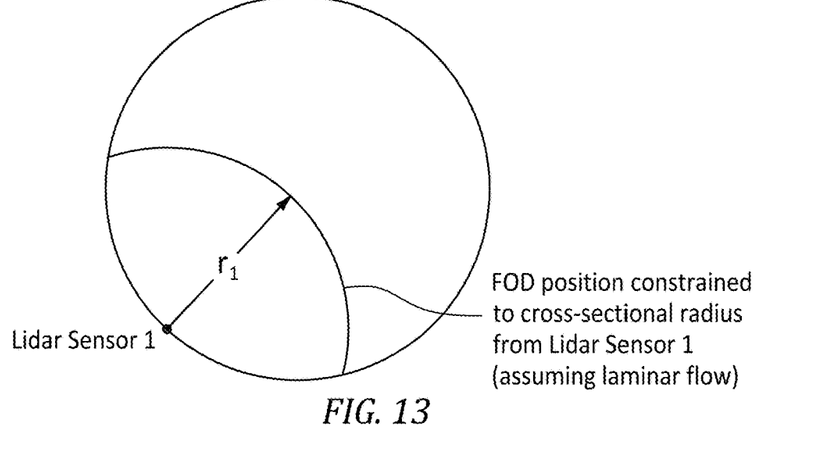
FIG. 13 is schematic view of the FIG. 10 LIDAR sensor embodiment that provides relative position and velocity (requires laminar flow assumption for absolute velocity).
Figure 14:
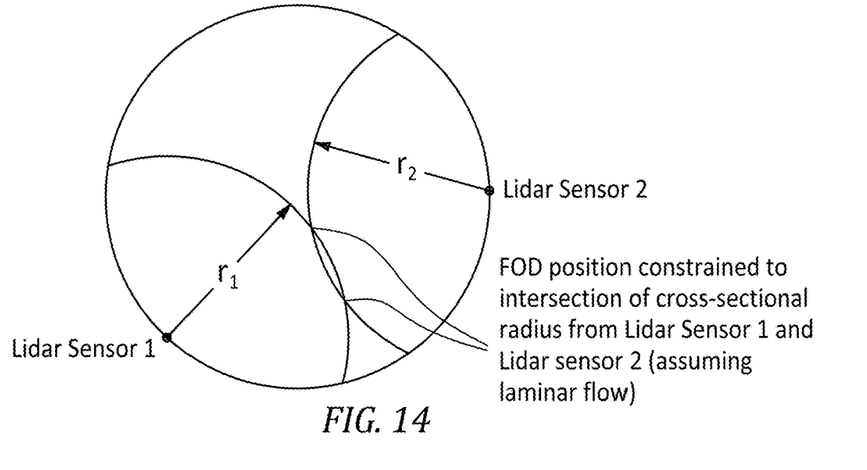
FIG. 14 is schematic view of the FIG. 11 LIDAR sensor embodiment that provides relative position and velocity (requires laminar flow assumption for absolute velocity, but provides indication as to if the FOD is not following a laminar flow trajectory).
Figure 15:
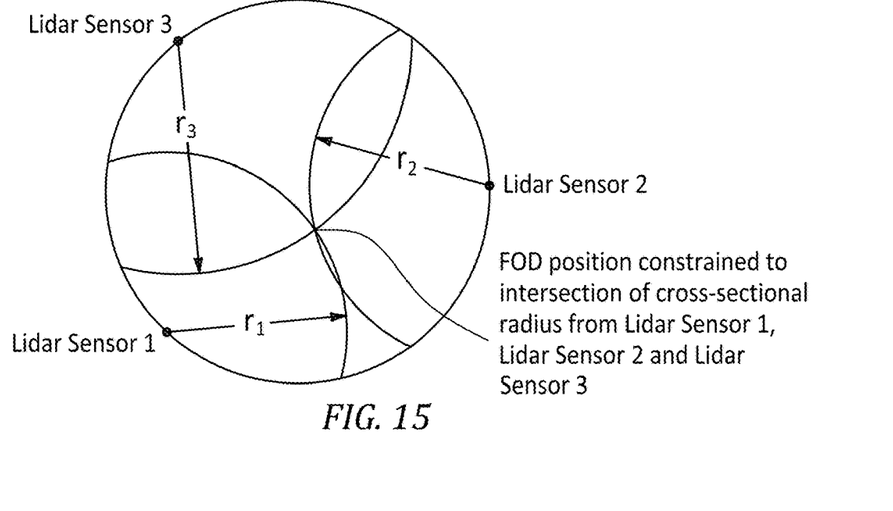
FIG. 15 is schematic view of the FIG. 12 LIDAR sensor embodiment that provides provides absolute position and velocity (without requiring laminar flow assumption).

Finally, FOD velocity is determined (416). One FOD particle velocity component (relative to the sensor) is then known via the velocity update average (414) that takes into account the relative position (FIG. 10) to thereby determine the FOD particle position with high spatial and velocity resolution, e.g, with one LIDAR sensor the position of the FOD is constrained to a radius from the sensor (FIG. 13), with two independent LIDAR sensors the position with respect to a particular LIDAR sensor is constrained to positions where the radii (of the two LIDAR sensors; (FIG. 14)) intersect, and with three independent LIDAR sensors, the absolute position and velocity of the FOD particle is known with respect to a reference (FIG. 15) such as the engine.

The system determines almost simultaneously the FOD particle velocity and relative position with high spatial resolution with only one detector and one modulated light source. The velocity is determined using the Doppler shift technique based on interferometry which results in a high spatial resolution. The system is not limited by detector noise (thermal noise) as the mixed signal is that which is detected and dependent on amplitude of reference modulated signal and particle scattering echo.

The LIDAR sensors are not blinded by external light sources or stray light which do not produce a resulting signal when mixed with modulated reference signal. The optical system may be configured to screen out particulate FOD such as water vapor, ice crystals, fog, smoke, dust, or ash in response to the chosen GHz-THz waveband that is transmissive with respect to the particulate FOD to be screened out. The particulate FOD may also be a marine aerosol, or salt particulates, such as water or oil droplets surrounding NaCl particulates which may be considered damaging FOD.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A system for particulate discrimination, comprising:
   a continuous wave (CW) laser;
   a modulator downstream of the continuous wave (CW) laser;
   a circulator downstream of the modulator;
   a detector in communication with the circulator;
   a controller; and
   a tangible, non-transitory memory configured to communicate with the controller, the tangible, non-transitory memory having instructions stored thereon that, in response to execution by the controller, perform operations comprising:

analyzing a frequency beats of a particle at different points in a modulated electromagnetic radiation pulse from the continuous wave (CW) laser to provide a particle velocity and a relative position of the particle; and     determining the particle velocity and a relative distance with respect to the source with a triangular modulation depending on a modulation rate B/I measuring two beats ($\Delta f_{up}$ and $\Delta f_{down}$) where the source emits at a frequency within a modulation bandwidth ($B=f_{max}-f_0$).

2. The system as recited in claim 1, wherein the modulated electromagnetic radiation pulse is a visual signal.

3. The system as recited in claim 1, wherein the modulated electromagnetic radiation pulse is an infrared signal.

4. The system as recited in claim 1, wherein the modulated electromagnetic radiation pulse is a terahertz signal.

5. The system as recited in claim 1, further comprising a sensor interface optic system downstream of the circulator.

6. The system as recited in claim 5, wherein the sensor interface optic system comprises a coupling optic in a surface of a gas turbine engine.

7. The system as recited in claim 6, further comprising a fiber optic in optical communication with the sensor interface optic system.

8. The system as recited in claim 7, wherein the fiber optic comprises a single core.

9. The system as recited in claim 7, wherein the fiber optic comprises a multiple of cores for coupling scattered light back to the circulator to mix the transmitted modulated electromagnetic radiation pulse with a return signal for processing.

* * * * *